United States Patent
Schweigert et al.

(10) Patent No.: US 6,285,570 B1
(45) Date of Patent: Sep. 4, 2001

(54) POWER MAINS SUPPLY UNIT FOR DIRECTLY AND/OR INDIRECTLY SUPPLYING CONSUMERS WITH POWER

(75) Inventors: Harald Schweigert, Vienna; Andreas Kranister, Wilhelmsburg, both of (AT)

(73) Assignee: Siemens Aktiengesellschaft Österreich, Vienna (AT)

( * ) Notice: Subject to any disclaimer, the term of this patent is extended or adjusted under 35 U.S.C. 154(b) by 0 days.

(21) Appl. No.: 09/214,941
(22) PCT Filed: Jul. 10, 1997
(86) PCT No.: PCT/AT97/00163
  § 371 Date: Jan. 15, 1999
  § 102(e) Date: Jan. 15, 1999
(87) PCT Pub. No.: WO98/04026
  PCT Pub. Date: Jan. 29, 1998

(30) Foreign Application Priority Data

Jul. 23, 1996 (AT) .................................. 1328/97

(51) Int. Cl.[7] .................. H02J 3/00; H02J 9/06
(52) U.S. Cl. ......................... 363/34; 307/64
(58) Field of Search ................. 363/34, 37, 125; 307/64, 66, 87

(56) References Cited

U.S. PATENT DOCUMENTS

| | | | |
|---|---|---|---|
| 5,099,410 | 3/1992 | Divan . | |
| 5,134,307 | * 7/1992 | Nakano | 307/87 |
| 5,579,197 | * 11/1996 | Mengelt et al. | 361/93 |
| 5,856,712 | * 1/1999 | Suzuki et al. | 307/64 |
| 5,867,377 | * 2/1999 | Suranyi | 363/60 |
| 5,909,360 | * 6/1999 | Lavin et al. | 363/21 |
| 5,982,652 | * 11/1999 | Simonelli et al. | 363/142 |
| 5,990,577 | * 11/1999 | Kamioka et al. | 307/26 |
| 5,994,794 | * 11/1999 | Wehrlen | 307/66 |
| 6,057,609 | * 5/2000 | Nagai et al. | 307/66 |

FOREIGN PATENT DOCUMENTS

| | | |
|---|---|---|
| 0458510 A | 11/1991 | (EP) . |
| 05 224786 A | 3/1993 | (JP) . |

OTHER PUBLICATIONS

Vol.017 No. 673 p–1658 Patent Abstracts of Japan Dec. 10, 1993.
Vol. 010 No. 007 p–419 Patent Abstracts of Japan Dated Jan. 11, 1986.
Vol. 095 No. 003 Patent Abstracts of Japan Dated Apr. 28, 1995.

* cited by examiner

*Primary Examiner*—Adolf Deneke Berhane
(74) *Attorney, Agent, or Firm*—Lackenbach Siegel Marzullo Aronson & Greenspan

(57) ABSTRACT

A mains power supply unit for the purpose of supplying consumers that are connected directly or by way of a voltage system converter to a direct voltage branch of a mains power supply unit comprises a buffer capacitor (C) that can be charged from the mains supply and that still supplies the direct voltage branch for a predetermined minimum period of time in the event of a failure or interruption in the mains supply. In such an event, the buffer capacitor (C) can be charged by way of a dedicated charging circuit (3) to a voltage ($U_2$), which, regardless of the voltage fluctuations in the direct voltage branch, is substantially constant and corresponds in a substantial manner to the upper limit value of the direct voltage ($U_1$) to which limit value the mains power supply unit is dimensioned. The buffer capacitor can be connected onto the direct voltage branch by way of a controlled switch (S) in the event of undervoltage in the mains supply or in the direct voltage branch.

5 Claims, 2 Drawing Sheets

POWER MAINS SUPPLY UNIT FOR DIRECTLY AND/OR INDIRECTLY SUPPLYING CONSUMERS WITH POWER

BACKGROUND OF THE INVENTION

1. Field of the Invention

The invention relates to a mains power supply unit for the purpose of supplying consumers that are connected directly or by way of a voltage system converter to a direct voltage branch of the mains power supply unit, comprising a buffer capacitor that can be charged from the mains supply and still supplies the direct voltage branch for a predetermined minimum period of time in the event of a failure or interruption in the mains supply.

2. Description of the Prior Art

In the case of electric energy converters, buffer capacitors are mostly provided, for example, in switched mode mains power supply units having an intermediate circuit voltage. In the case of a large mains supply voltage range, buffer capacitors of this type are to be dimensioned to the maximum voltage. Consideration must be given, however, to the fact that when there is a failure in the mains supply, the capacitors are only charged to the intermediate circuit voltage corresponding to the minimum mains supply voltage. Owing to the quadratic dependency of the energy content of a capacitor upon the voltage, the stored energy is well below the possible maximum, so that the buffer time becomes too short, for example, to make possible any further procedures of data protection for the consumer.

Regardless of the problem of the energy content, when supplying from alternating current mains supply, extreme distortions and corresponding high harmonic content in the alternating current mains supply may occur by virtue of the periodic, pulsed recharging of the capacitors.

Three different solutions are known for eradicating or reducing these problems:

a) Broaden the working range of the consumer (converter) to achieve lower supply voltages, whereby the buffer capacitors can be discharged to a lower voltage when the function of the consumer is maintained. The disadvantages of this solution are high development costs, as this almost reaches the boundaries of technical viability, inefficient use of the converter and that the distortions are not taken into consideration.

b) With regard to the required energy content, dimension the buffer capacitor to the minimum supply voltage. This results in the buffer capacitor being considerably over-dimensioned and also results in only a part of the storage capacity being used. Weight, volume and price of the buffer capacitor take on undesired values and the distortions to the mains supply become even greater.

c) By preconnecting a stabilised high-setting step, hold the voltage at the buffer capacitor at a fixed value irrespective of fluctuations in the mains supply voltage. This solution requires a dedicated switched mode mains power supply step, and solves the two problems stated above. However, it also demands a considerable outlay for the development and production, and to accept a larger space requirement.

EP 0 525 898 discloses a circuit that, by way of a capacitive voltage divider, obtains a feed current for the control circuit of a controlled switch, in order to enable the circuit to run-up during initiation of said circuit. Neither a buffer capacitor nor the controlled connection thereof is disclosed.

EP 0 622 889 A2 describes a switched mode mains power supply unit, which is to serve as a pre-controller, for example, for television apparatuses, and wherein the direct current at a load capacitor is controlled by means of an FET switching transistor so that this voltages is always substantially equal in the event of different alternating mains supply voltages, for example, 240 V and 120 V. The load capacitor is always connected in parallel with the load and cannot be considered to be a buffer capacitor.

The circuit disclosed in EP 0 223 316 A2 is a high-setting controller that has variable switching frequency and comprises a load capacitor that is always connected in parallel with the load, a capacitor of an LC input filter and a capacitor of an RC integration element, but not, however, a connectable buffer capacitor.

EP 0 256 569 A1 discloses a mains supply unit that comprises a longitudinal controller and is controlled so that the voltage ripple on the load moves towards zero, wherein the longitudinal controller transistor only has to obliterate the minimum power loss possible, since only the alternating voltage component is connected to said longitudinal controller transistor. In this case a load capacitor is also always connected in parallel with the load; no connectable buffer capacitors are revealed.

SUMMARY OF THE INVENTION

It is the object of the invention to find a more convenient and less costly solution to problems that often occur in conjunction with buffer capacitors.

This object is achieved by means of a mains power supply unit wherein the buffer capacitor can be charged by way of a dedicated charge circuit to a voltage, which, regardless of the voltage fluctuations in the direct voltage branch, is substantially constant and corresponds in substantial manner to the upper limit value of the direct voltage, to which limit value the mains power supply unit is dimensioned and the buffer capacitor can be connected to the direct voltage branch by way of a controlled switch in the event of undervoltage in the mains supply or in the direct voltage branch.

The invention enables the buffer capacitor (or the buffer capacitors) to always be charged to the maximum voltage, so that said capacitor stores a maximum quantity of energy and corresponds subsequently to a maximum, constant buffer time. It is therefore no longer necessary to over-dimension the capacitor. Since the buffer capacitor is only charged on one occasion and is not discharged/charged in periodic manner, its use does not lead to increased harmonic content in an alternating current mains supply.

The supply voltage, which is, in general, an intermediate circuit voltage, is thus connected directly to the consumer and/or the converter preconnected thereto. The buffer capacitor is charged to its planned and permissible maximum voltage by way of a charging circuit, which, for example, can be a voltage multiplier, a straightforward flyback converter or the like, wherein after the charging process only the leakage currents of the capacitor have to be compensated. When a failure in the mains supply is detected, the buffer capacitor (or a series and/or parallel connection of buffer capacitors) is connected with the aid of a suitable switch, in particular a semi-conductor switch, such as thyristor, triac, etc., to the consumer or intermediate circuit.

BRIEF DESCRIPTION OF THE DRAWINGS

Further features of the invention are characterized in the dependent subordinate claims. The invention and its other advantages are explained in detail below with reference to exemplified embodiments that are illustrated in the drawing, in which:

DESCRIPTION OF THE PREFERRED EMBODIMENTS

Figure 1:
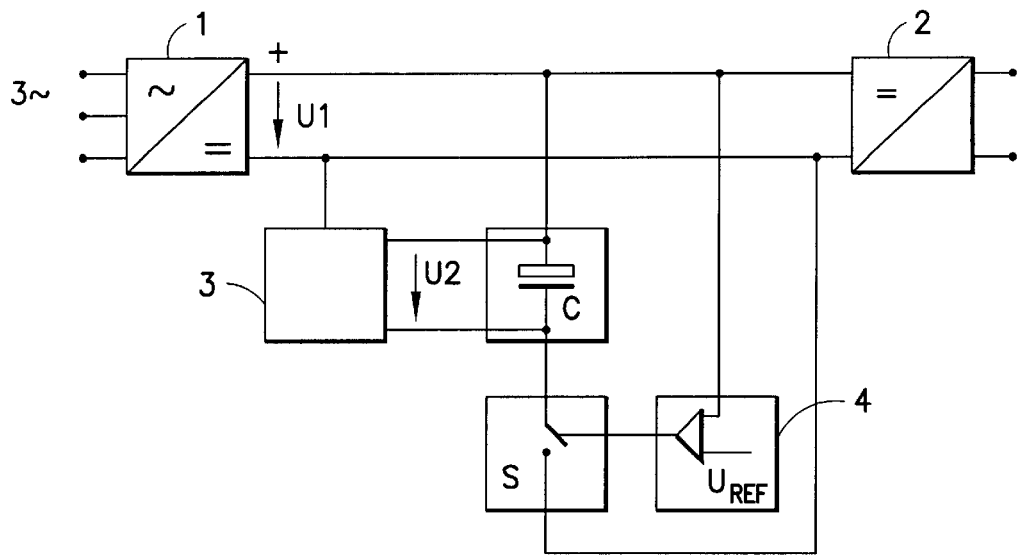
FIG. 1 shows a block circuit diagram of a first embodiment of the invention.

FIG. 1 illustrates a mains power supply unit in which a rectifier and input part 1 is connected to three phases of an alternating voltage mains supply. The output of rectifier and input part 1, which can contain filters, etc., in addition to rectifiers, is connected to an intermediate circuit direct voltage U1, which in turn is supplied to a voltage system converter 2. The output of voltage system converter 2 is connected to one consumer or several consumers (not illustrated), for example, computers, logical units, motors, etc. For example, the voltage system converter 2 can convert an intermediate circuit voltage of 320 V into a direct voltage of 24 V.

The intermediate circuit is provided with a buffer capacitor C, which, however, is not always connected to the intermediate circuit voltage U1, as is the case in the prior art. On the contrary, this buffer capacitor can be connected in parallel with the intermediate circuit, that is, the input of the voltage system converter 2 by way of a controlled circuit switch S, and the buffer capacitor can be charged by way of a dedicated charging circuit 3 to a voltage U2 that is greater than the maximum value of the direct voltage U1 in the intermediate circuit. The voltage U2 can be obtained from the alternating current mains supply, for example, by doubling the voltage, and can therefore be twice the value of U1 (U2=2. U1). Of course, the charging circuit 3 can also be supplied by the intermediate circuit voltage.

Disregarding unavoidable leakage current, it is evident that the capacitor C is neither charged nor discharged during normal operation.

The switch S is controlled by a control circuit 4 that is arranged to compare the intermediate circuit voltage U1 with a reference voltage $U_{ref}$ and that controls the switch S in such a manner that said switch closes, if the intermediate circuit voltage U1 falls below a predetermined value. However, it is also possible to compare the voltage in the alternating current mains supply to a reference value so as to determine a mains supply failure or interruption.

When the mains supply voltage falls below a predetermined value, the buffer capacitor C, which is charged to the voltage U2, is also connected to the voltage system converter 2, which over a predetermined buffer time supplies the consumer with electric energy. It is known that this is necessary in critical applications, for example, in order to safeguard data or to terminate a control procedure. A diode, for example, must ensure that when connecting the capacitor C, the energy thereof is not able to flow into the input part 1.

In general, the voltage at the capacitor C, regardless of the mains supply voltage, should comprise a value that corresponds to the highest value beneficial for the buffer capacitor C and for the consumers connected to the direct voltage branch.

Figure 2:
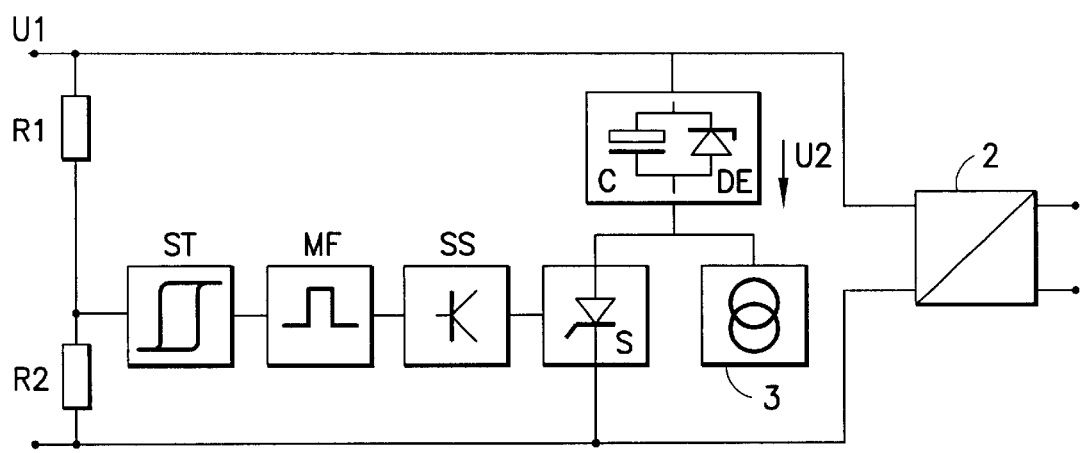
FIG. 2 shows a block circuit diagram of second embodiment of the invention.

As shown in FIG. 2, the direct voltage U1, for example, an intermediate circuit voltage, is supplied, after division by a voltage divider R1/R2, to a Schmitt-trigger ST, the threshold voltage of which corresponds to the reference voltage $U_{ref}$ of FIG. 1. The Schmitt-trigger ST is followed by a monoflop MF. Downstream of this monoflop MF there is disposed a control step SS for a thyristor switch S. The thyristor switch S is connected in series with the buffer capacitor C, and a Zener diode DZ is connected in parallel therewith for the purpose of limiting the voltage. The buffer capacitor C is charged by the charging circuit 3, shown here as a current source.

Figure 3:
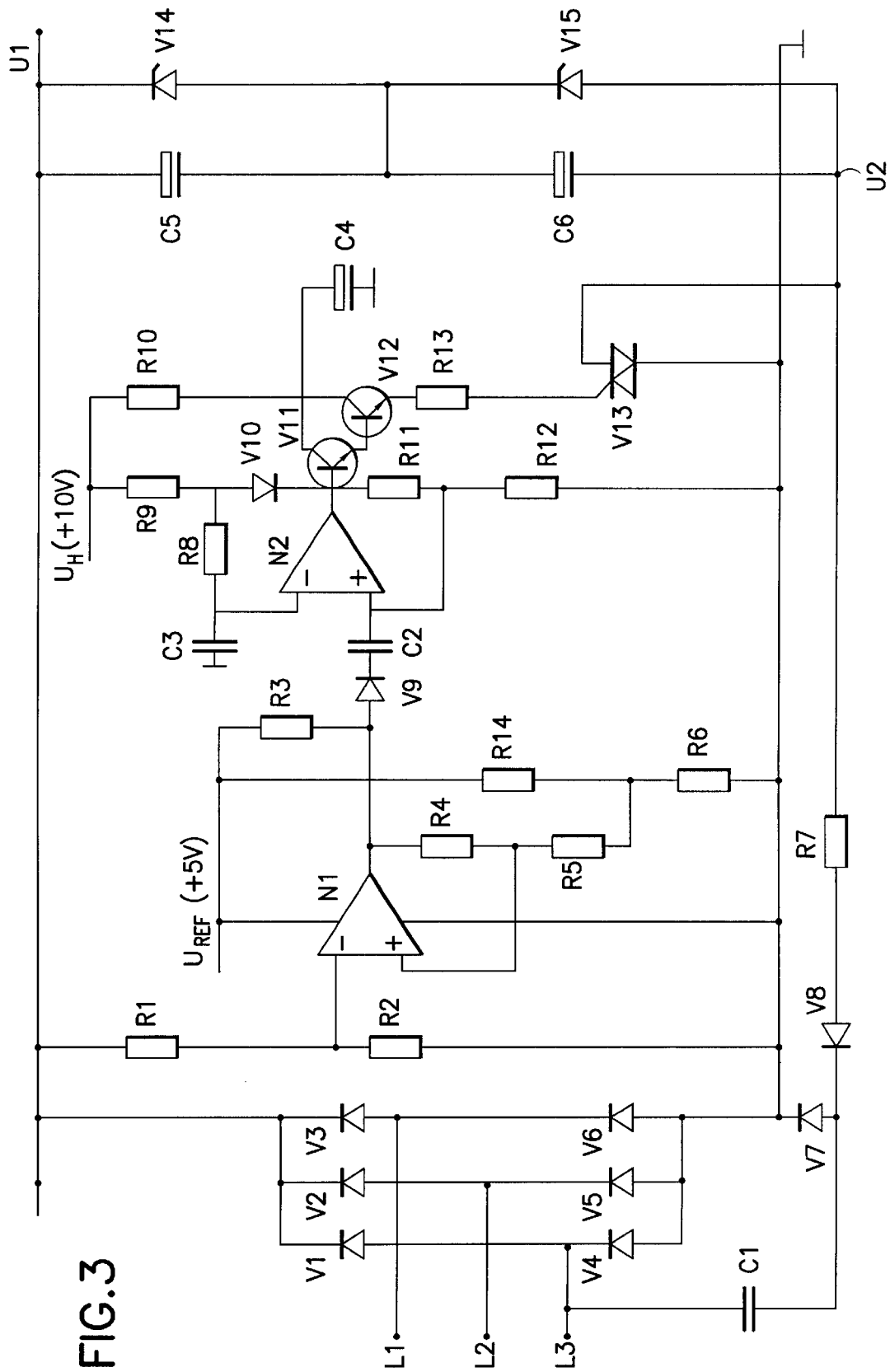
FIG. 3 shows a detailed circuit diagram of a practice-oriented embodiment of the invention.

One embodiment hitherto implemented in practice will now be explained with reference to FIG. 3. A three-phase alternating current mains supply is provided from which a bridge rectifier V1 . . . V6 produces the intermediate circuit voltage U1, for example, 540 V. This voltage is connected to the consumer, e.g., a converter, where appropriate, after filtering through capacitors and a choke (not illustrated).

In the present example, two electrolyte capacitors C5, C6 connected in series are provided as buffer capacitors that in each case are to be charged to approximately 360 V. In this case a known voltage doubling circuit consists of a capacitor C1 and the diodes V7 and V8, and charges the capacitors C5, C6 by way of a resistor R7 that limits the charging current. The maximum voltage provided at each capacitor C5 and/or C6 is fixed by virtue of a parallel-connected Zener diode V14 and V15, respectively, in the present example, to 360 V, respectively, so that the total voltage at C5+C6 amounts to 720 V.

A part of the intermediate circuit voltage U1 that is fixed by virtue of a voltage divider R1/R2, is supplied to the inverting input of an operational amplifier N1, which together with the resistors R4, R5, R6 and R14, forms a Schmitt-trigger. The amplifier N1 is supplied by a voltage $U_{Ref}$, in the present case, +5 Volts.

When the mains supply fails, the voltage U1 and therefore the voltage at the voltage divider R1/R2 fall, at which point the output, connected by $U_{Ref}$ by way of a pull-up-resistor R3, of the Schmitt-trigger jumps from a predetermined value to positive level. This voltage jump passes by way of a diode V9 and a capacitor C2 to the non-inverting input of a further operational amplifier N2, wherein the capacitor C2, together with the resistor network R3, R11, R12, forms a differential element.

The inverting input of the amplifier N2, which is also supplied by the voltage $U_{Ref}$, is connected by way of the series connection of two resistors R8 and R9 to an auxiliary voltage $U_H$, in this case, +10 Volts, and is connected by way of a capacitor C3 to earth. The connection point of the resistors R8 and R9 is linked by way of a diode V10 to the output of the amplifier N2, which is connected to earth by way of the series connection of a resistor R11 and the resistor R12 and to the base of a Darlington-transistor pair V11+V12. The collectors of this pair are linked by way of a resistor R10 to the auxiliary voltage $U^H$ and likewise by way of a capacitor C4 to earth. The emitter of the transistor V12 is connected by way of a resistor R13 to the gate of a TRIAC-switch V13 whose switching path is between the negative terminal of the buffer capacitor series connection C5+C6 and earth. The TRIAC V13 thus corresponds to the switch S of FIGS. 1 and 2.

As soon as the pulse described above passes by way of the capacitor C2 to the non-inverting input of the amplifier N2, said amplifier is blocked and a corresponding voltage level of 2.5 Volts, for example, is forced by way of the voltage divider R9, R11, R12 at the non-inverting input until the capacitor C3 has been charged to the same value by way of the resistors R8 and R9. During this time a voltage pulse occurs at the base of the Darlington pair V11/V12, for example, at rate of 4.7 V /27 ms, and the Darlington pair V11/V12 provides a current pulse to the TRIAC switch V13, which is blocked up to that point, the current pulse of which-for the purpose of discharging the source of the voltage $U^H$—is drawn mainly from the capacitor C4. During the entire on-transition time this current pulse is held by virtue of the current source V11, V12, R13 in a constant manner at the safe gate trigger current of the TRIAC, as required by the manufacturer, e.g., 100 mA. The TRIAC switch V13 now switches through and applies the buffer capacitor series connection C5 +C6 to the intermediate circuit for a predetermined time period. During this time the buffer capacitors can relay the main part of their energy content to the consumer, for example, a power of 1 kW over 227 ms, in a typical case of application.

What is claimed is:

1. Mains power supply unit for supplying consumers that are connected directly or by way of a voltage system converter to a direct voltage branch of the mains power supply unit, comprising a buffer capacitor that can be charged from the mains supply and that still supplies the direct voltage branch for a predetermined minimum period of time in the event of a failure or interruption in the mains supply; and dedicated charging circuit means for charging the buffer capacitor to a voltage that, regardless of the voltage fluctuations in the direct voltage branch, is substantially constant and substantially corresponds to the upper limit value of the direct voltage, to which limit value the mains power supply unit is configured, and the buffer capacitor can be connected onto the direct voltage branch by way of a controlled switch in the event of undervoltage in the mains supply or in the direct voltage branch.

2. Mains power supply unit according to claim 1, characterized in that the control input of the controlled switch is connected to the output of a control circuit, which is arranged to compare the direct voltage of the direct voltage branch to a reference voltage.

3. Mains power supply unit according to claim 1 or 2, wherein the mains supply is an alternating current mains supply, characterized in that the charging circuit is a voltage doubling circuit connected to the alternating voltage.

4. Mains power supply unit according to any one of the claims 1 to 3, characterized in that a voltage limiting circuit is provided for the purpose of limiting the capacitor voltage.

5. Mains power supply unit according to claim 4, characterized in that a Zener diode is connected in parallel with the buffer capacitor.

* * * * *